United States Patent [19]

Sahara et al.

[11] 4,295,724

[45] Oct. 20, 1981

[54] ELECTRIC SELF-TIMER DEVICE FOR CAMERAS

[75] Inventors: Masayoshi Sahara, Sennan; Masaaki Nakai, Nara, both of Japan

[73] Assignee: Minolta Camera Kabushiki Kaisha, Osaka, Japan

[21] Appl. No.: 55,518

[22] Filed: Jul. 9, 1979

Related U.S. Application Data

[63] Continuation of Ser. No. 940,107, Sep. 6, 1978, abandoned.

[30] Foreign Application Priority Data

Sep. 12, 1977 [JP] Japan ............................. 52/123438

[51] Int. Cl.³ ...................... G03B 17/18; G03B 17/40
[52] U.S. Cl. ...................................... 354/238; 354/289
[58] Field of Search ................... 354/60 L, 238, 289, 354/267

[56] References Cited

U.S. PATENT DOCUMENTS

| | | | |
|---|---|---|---|
| 3,592,113 | 7/1971 | Wasielewski | 354/51 |
| 3,667,367 | 6/1972 | Miyagawa | 354/238 |
| 4,038,675 | 7/1977 | Kitai et al. | 354/238 |
| 4,134,660 | 1/1979 | Sakurada et al. | 354/238 |

FOREIGN PATENT DOCUMENTS 47-804 12/1972 Japan .

*Primary Examiner*—Michael L. Gellner
*Attorney, Agent, or Firm*—Watson, Cole, Grindle & Watson

[57] ABSTRACT

An electric self-timer device for a camera includes a timer circuit sequentially generating first and second signals, with respective predetermined delays in response to a trigger signal of the device, an oscillator responsive to the trigger signal to generate a first oscillating signal of a predetermined frequency and also responsive to the first signal to generate a second oscillating signal having a frequency distinguishably higher than that of the first oscillating signal, a light emitting diode energized by the first and second oscillating signals, a circuit responsive to the second signal to cease the oscillation or actuation of the oscillator, and an electromagnetic release device also responsive to the second signal to release the camera shutter. The self-timer device intermittently energizes the light emitting diode during the entire delay period to enable a person being photographed to recognize that the delay action is being effected, and changes-over the energization frequency of the light emitting diode to a higher frequency a predetermined time before shutter release is effected to indicate the moment of shutter release to the person being photographed.

6 Claims, 3 Drawing Figures

ELECTRIC SELF-TIMER DEVICE FOR CAMERAS

This is a continuation, of application Ser. No. 940,107 filed Sept. 6, 1978 now abandoned.

FIELD OF THE INVENTION

The present invention relates to an electric self-timer device for cameras, and more particularly to an electric self-timer device indicating that the self-timer is operating.

BACKGROUND OF THE INVENTION

In a known self-timer device, an electric delay function is carried out by an electric circuit and is constructed so that it flashes or intermittently lights a luminous indicating means during the self-timer operation to clearly indicate for a person to be photographed that the self-timer is operating. Another known self-timer device is constructed such that it flashes or intermittently lights the luminous indicating means a few seconds before the shutter is released to inform a person to be photographed of the imminent shutter release time. Thus, such known self-timer devices may indicate either that the self-timer is operating or when the shutter is about to be released. For self-timer photography, however, it is desirable that both the operation of the self-timer and the imminent shutter release time are indicated in a mode capable of easy identification and eminent recognition.

SUMMARY OF THE INVENTION

Accordingly, the primary object of the present invention is to provide an electric self-timer device for cameras, in which a luminous indicating means is flashed or intermittently lit to indicate to the person to be photographed that the self-timer is operating, and at the same time to adequately inform that person of the imminent shutter release time.

To accomplish that object, the self-timer device according to the present invention comprises a luminous indicating means which is flashed or intermittently lit for a period from the actuation of the self-timer to the shutter release time, and at the same time the flashing or intermittent lighting frequency of the luminous indicating means is changed at an appropriate time immediately before the shutter is released to adequately inform a person to be photographed of the imminent shutter release time and aid that person to prepare for the photograph. More particularly, the self-timer device according to the present invention includes a self-timer starter, a timer circuit, an oscillator and a luminous indicating means. The timer circuit generates a first signal after a lapse of a given time from the actuation of the self-timer, i.e. the operation of the self-timer starter, and following the operation of the self-timer starter the oscillator starts operating and changes its oscillation frequency in response to the first signal. In response to such oscillation, the luminous indicating means flashes or intermittently lights. Such operation indicates for the person to be photographed that the self-timer device is operating by flashing or intermittently lighting the luminous indicating means to provide a most conspicuous indication, and at the same time adequately informs that person of the imminent shutter release by means of the change in the flashing or intermittent lighting frequency of the luminous indicating means without changing the flashing or intermittent lighting indication mode.

In a mode according to a preferred embodiment of the present invention, the above-mentioned self-timer device includes an electromagnetic release device for actuating the camera shutter, and the timer circuit is constructed such that it generates a second signal following the first signal after a lapse of a second given time which is longer than the above-mentioned given time from the actuation of the self-timer. In response to the second signal, the electromagnetic release device starts operating. Additionally, another circuit is provided to stop the oscillator in response to the second signal to thereby prevent unnecessary power consumption caused by operation of the luminous indicating means.

Furthermore, the oscillator comprises a capacitor, a controllable charging and discharging circuit for either charging or discharging the capacitor, a reference voltage generator to provide first and second level reference voltage outputs, a comparator which compares the charged voltage of the capacitor with the reference voltage output so that its output is inverted each time the relationship between the reference voltage and charging voltage is inverted in accordance with a change in the charging voltage due to charging or discharging of the capacitor, a first change circuit which changes the reference voltage between first and second level outputs, and which also changes the charging and discharging circuit between a charging and discharging mode in response to the output inversion of the comparator, and a second change circuit which changes the setting of the second level output of the reference voltage generator in response to the first signal from the timer circuit. The luminous indicating means is connected to the output terminal of the comparator, thereby repeatedly flashing or intermittently lighting in response to the output inversion of the comparator. Such an oscillator circuit arrangement is very adaptable for integrated circuitry, thus providing a simply constructed self-timer device.

The above and other objects and features of the present invention are apparent from the following description of a preferred embodiment taken in conjunction with the accompanying drawings.

DETAILED DESCRIPTION OF THE PREFERRED EMBODIMENT

Figure 1:
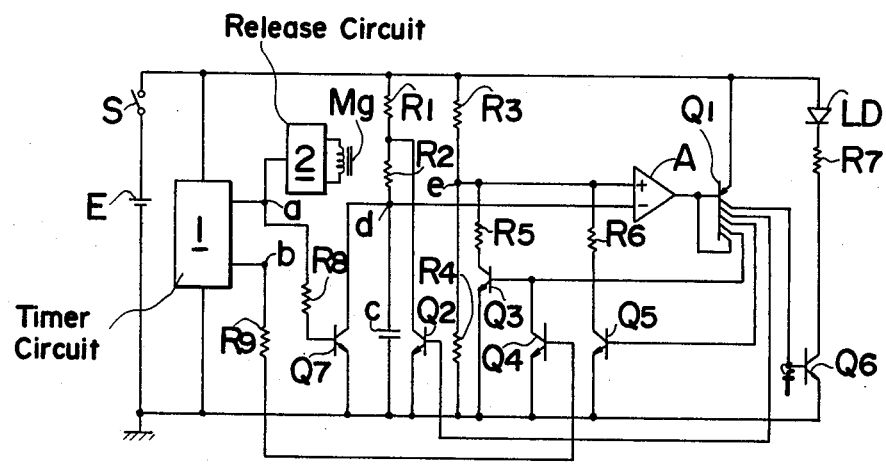
FIG. 1 is an electric circuit diagram of a preferred embodiment according to the present invention.

FIG. 1 shows power supply battery E and self-timer starter switch S. The output at terminal b of timer circuit 1 after a lapse of a first given time is inverted from a "low" to a "high" level, and the output at terminal a after a lapse of a second given time is inverted from a "low" to a "high" level, respectively, when switch S is closed. The second given time is arranged to be of longer duration than the first given time. Electromagnetic release circuit 2 operates in accordance with the output inversion at terminal a, and electromagnet Mg actuates shutter release. Comparator A, capacitor C, transistors Q1 through Q5 and resistors R1 through R6 constitute an oscillator which operates in a relatively low frequency mode for a given period of time after the start of a self-timer (to be more fully described), then in a relatively high frequency mode and subsequently stops operating after a lapse of a given time from the actuation of self-timer starter switch S. Transistors Q1 and Q2, resistors R1 and R2 and capacitor C constitute a charging and discharging circuit to charge or discharge capacitor C in response to the output signal of comparator A. The charging of capacitor C is carried out through resistors R1 and R2, and the discharging of capacitor C is done through resistor R2 and transistor Q2. The negative inverting input terminal of comparator A is coupled to node d between resistor R2 and capacitor C. Resistors R3 and R4 form the basic section of a reference voltage generator, with intervening node e coupled to the positive non-inverting input terminal of comparator A. Furthermore, resistors R5, R6 and R9, and transistors Q1, Q3, Q4 and Q5 constitute a part of the reference voltage generator and a change circuit which changes the output levels of the reference voltage. In the above arrangement, when the output level at output terminal b of timer circuit 1 is inverted from a "low" to a "high" signal, transistor Q4 is turned on. And transistor Q3 remains non-conductive even if transistor Q1 conducts afterward. Transistors Q1 and Q6, resistor R7 and indication light emitting diode LD constitute a luminous indicating means. Additionally, transistor Q7 and resistor R8 form a circuit which is turned on when the output level at output terminal a of timer circuit 1 is inverted from a "low" to a "high" signal, to discharge capacitor C, thereby causing the oscillator to remain inoperative.

Figure 2:
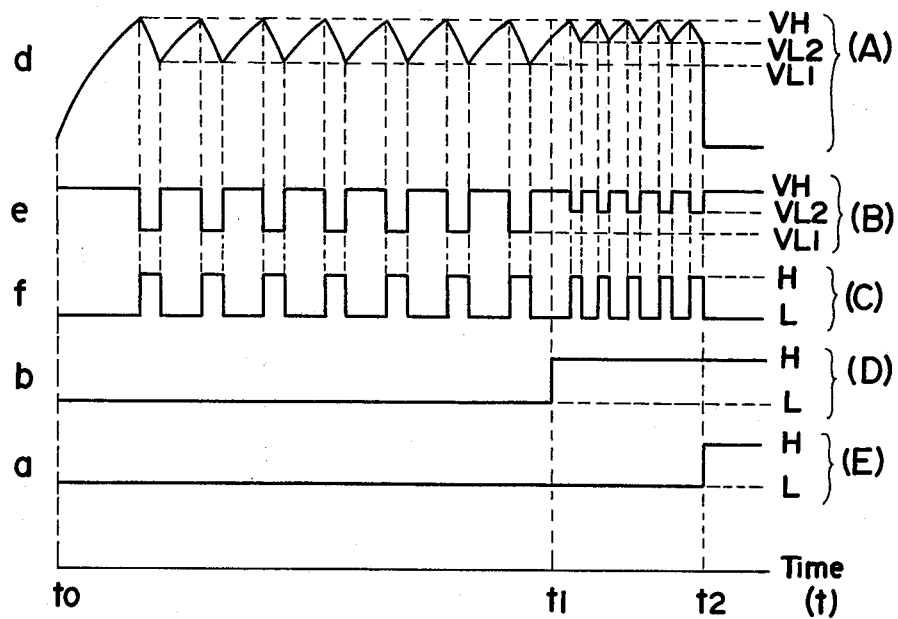
FIG. 2 is a time chart which shows the operation of the above embodiment with respect to certain signals bearing the same literal legends identified in the circuit of FIG. 1.

Referring to the time chart shown in FIG. 2, when switch S is closed at time t0, timer circuit 1 starts operating to charge capacitor C through resistors R1 and R2. That operation causes the voltage at node d to rise, and when the voltage at node e reaches voltage VH as shown in FIG. 2 (A), the output of comparator A is inverted from a "high" to a "low" level. That inversion makes transistors Q1 through Q6, except transistor Q4, conductive to energize light emitting diode LD, and at the same time, as shown in FIG. 2 (B), the voltage at node e decreases to VLI. Also, charged capacitor C is discharged through resistor R2 and transistor Q2. When the discharge of capacitor C causes the voltage at node d to decrease to voltage VL1 at node e, the output of comparator A is inverted from a "low" to a "high" level so that transistors Q1 and Q2, Q3, Q4 and Q6 are made non-conductive thereby recharging capacitor C through resistors R1 and R2. That operation causes the voltage at node e to rise to VH again, while light emitting diode LD is extinguished. The same operation is repeated thereafter up to a first given time t1, with indication light emitting diode LD being flashed or intermittently lit at a predetermined frequency.

At a first given time t1, the output at terminal b of timer circuit 1 is inverted from a "low" to a "high" level so that transistor Q4 conducts. Therefore, in the subsequent operation of the circuit, even when the output of comparator A is inverted to a "low" level, transistor Q3 remains non-conductive, and the voltage at node e rises to VL2, which is a higher voltage than VL1, as shown in FIG. 2 (B). Since the charging and discharging time constants of capacitor C remain unchanged from that prior to given time t1, the time for the voltage at node d to reach that at node e becomes shorter, causing the interval of the output inversion at comparator A to be shortened. That is, the oscillation period becomes shorter, causing indication light emitting diode LD to flash or intermittently light at a predetermined frequency which is higher than that prior to given time t1.

When given time t2 is reached, the output level at node a of timer circuit 1 is inverted from a "low" to a 37 high" level, and the charge of capacitor C is instantly discharged by transistor Q7, thereby decreasing the output level at node d. Thereafter, the output of comparator A is fixed at a "high" level while transistors Q1, Q2, Q4, Q5 and Q6 all remain non-conductive, and indication light emitting diode LD also remains unlit. Further, simultaneously with the output inversion at node a, electromagnetic release device 2 starts operating, with electromagnet Mg actuating the camera shutter release operation. Preferably, time duration t1-t0 will be 7 to 8 seconds and time duration t2-t1 will be 2 to 3 seconds.

Figure 3:
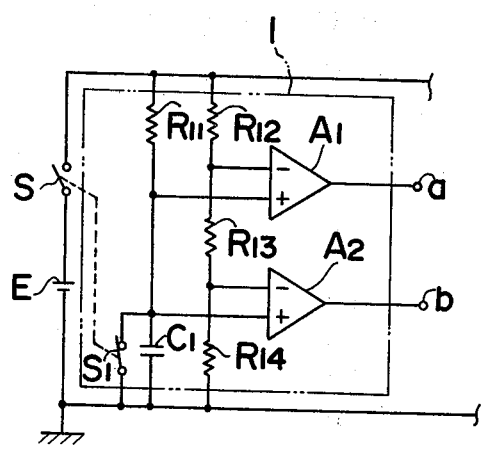
FIG. 3 is an electric circuit diagram showing an embodiment of the timer circuit shown in FIG. 1.

FIG. 3 shows an embodiment of timer circuit 1 of FIG. 1. In FIG. 3, resistor R11 and capacitor C1 constitute an integrating circuit and resistors R12, R13 and R14 form a reference voltage generator. The negative inverting input terminal of comparator A1 is connected to the junction of resistors R12 and R13, and the positive non-inverting input terminal is connected to the junction of resistor R11 and capacitor C1. Output terminal a corresponds to output terminal a of timer circuit 1 shown in FIG. 1. However, the negative inverting input terminal of comparator A2 connects to the junction of resistors R13 and R14, and the positive non-inverting input terminal connects to the junction of capacitor C1 and resistor R11; output terminal b corresponds to output terminal b of timer circuit 1 shown in FIG. 1. Switch S1 is opened and closed in antiphase relation to switch S for use in starting the self-timer, being especially for use in discharging capacitor C1.

With respect to the operation of switch S1, when switch S for the actuation of the self-timer is closed at a given time t0, switch S1 for discharging capacitor C1 is opened, thereby starting the charging of capacitor C1 through resistor R11. At a given time t1, when the voltage at the junction of capacitor C1 and resistor R11 equals that at the junction of resistors R13 and R14, the voltage level at output terminal b of comparator A2 is inverted from a "low" to a "high" level. Further, at a given time t2, when the voltage at the junction of capacitor C1 and resistor R11 equals that at the junction of resistors R12 and R13, then the voltage at output terminal a of comparator A1 is inverted from a "low" to a "high" level.

It is to be understood that in the embodiments shown in FIGS. 1 and 3, the circuitry except those elements requiring external connections, such as the capacitor, switch, magnet and light emitting diode, can be easily provided by semiconductor ICs thereby enabling a very simple construction of the self-timer device.

It is also to be understood that timer circuit 1 may be replaced with a pair of one-shot flip-flop circuits known to those skilled in the art.

What is claimed is:

1. An electronic self-timer device for a camera having a shutter comprising:
   a manually operable self-timer starter;
   a timer circuit including means for generating a first signal after a first predetermined time duration from the actuation of said self-timer starter and before commencement of an exposure;

an oscillator responsive to the actuation of said self-timer starter for generating a first oscillating signal of a predetermined frequency, said oscillator being also responsive to said first signal for generating a second oscillating signal of a frequency distinguishably different from that of the first oscillating signal, a variable time constant R-C circuit, a circuit for generating an oscillating signal having a frequency dependent upon the value of the time constant of said R-C circuit, and a switching circuit responsive to said first signal from said timer circuit for changing the time constant of said R-C circuit from one value to another; and luminous indicating means responsive to the first and second oscillating signals to be lit intermittently in accordance with the respective frequencies of the first and second oscillating signals.

2. An electronic self-timer device for a camera having a shutter comprising:

a manually operable self-timer starter;

a timer circuit including means for generating a first signal after a first predetermined time duration from the actuation of said self-timer starter and before commencement of an exposure;

an oscillator responsive to the actuation of said self-timer starter for generating a first oscillating signal of a predetermined frequency, said oscillator being also responsive to said first signal for generating a second oscillating signal of a frequency distinguishably different from that of the first oscillating signal, said oscillator further including a capacitor, a charge and discharge circuit selectively constituting a charge path and a discharge path for said capacitor, a reference voltage generator for selectively generating first and second reference voltages of different levels from one another, a first switching circuit including a comparator for comparing the voltage across said capacitor with said first and second reference voltages to generate an output signal inverted each time the voltage level across said capacitor is inverted relative to said first and second reference voltages as said capacitor is charged and discharged by said charge and discharge circuit, said first switching circuit being connected to said charge and discharge circuit and said reference voltage generator such that at each inversion of said comparator output said charge and discharge circuit alternatively charges and discharges said capacitor, and said reference voltage generator alternatively generates said first and second reference voltages, a second switching circuit responsive to said first signal for switching-over the level of said second reference voltage from a first level to a second level; and luminous indicating means responsive to the first and second oscillating signals to be lit intermittently in accordance with the respective frequencies of the first and second oscillating signals.

3. An electronic self-timer device as defined in claim 2, further comprising means for actuating said camera shutter, and wherein said timer circuit further includes means for generating a second signal after a second predetermined time duration from the actuation of said self-timer starter, said second time duration is longer than said first time duration, said means for actuating said shutter being responsive to said second signal.

4. An electronic self-timer device as defined in claim 3, further comprising a circuit responsive to said second signal for terminating the oscillation of said oscillator.

5. An electric self-timer as defined in claim 2, wherein said luminous indicating means is connected to said comparator to be intermittently lit in accordance with the inversion of said comparator output.

6. An electric self-timer as defined in claim 5, wherein said second level is set higher than said first level and lower than the level of said first reference voltage.

* * * * *